(12) United States Patent
Malkin et al.

(10) Patent No.: US 7,296,021 B2
(45) Date of Patent: Nov. 13, 2007

(54) METHOD, SYSTEM, AND ARTICLE TO SPECIFY COMPOUND QUERY, DISPLAYING VISUAL INDICATION INCLUDES A SERIES OF GRAPHICAL BARS SPECIFY WEIGHT RELEVANCE, ORDERED SEGMENTS OF UNIQUE COLORS WHERE EACH SEGMENT LENGTH INDICATIVE OF THE EXTENT OF MATCH OF EACH OBJECT WITH ONE OF SEARCH PARAMETERS

(75) Inventors: Peter Malkin, Westchester County, NY (US); Tracee Wolf, Westchester County, NY (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 10/850,118

(22) Filed: May 21, 2004

(65) Prior Publication Data

US 2006/0004734 A1 Jan. 5, 2006

(51) Int. Cl.
*G06F 17/30* (2006.01)
*G06F 17/00* (2006.01)
*G06F 3/048* (2006.01)

(52) U.S. Cl. .............................. 707/7; 707/3; 707/102; 707/200; 715/968

(58) Field of Classification Search .................... 707/1, 707/3–7, 100, 102, 103 Z, 104.1, 200, 203, 707/205; 715/501.1, 511–513, 968; 709/218–222; 706/45–50
See application file for complete search history.

(56) References Cited

U.S. PATENT DOCUMENTS 5,864,871 A * 1/1999 Kitain et al. .............. 707/104.1
5,911,139 A * 6/1999 Jain et al. ...................... 707/3
6,070,176 A * 5/2000 Downs et al. ............... 715/513
6,094,648 A * 7/2000 Aalbersberg ................... 707/3
6,112,172 A * 8/2000 True et al. ................... 704/235

(Continued)

FOREIGN PATENT DOCUMENTS

EP 1574972 * 9/2005 ................... 17/30

(Continued)

OTHER PUBLICATIONS

Edward Suvanaphen et al. "textual difference visualizatin of multiple search results utilizing detail in context", proceedings of the theory and practice of computer graphics 2004, pp. 1-7.*

(Continued)

*Primary Examiner*—Srirama Channavajjala
(74) *Attorney, Agent, or Firm*—Lawrence Harbin; Derek S. Jennings

(57) ABSTRACT

A method of searching a collection of data that includes specifying a compound query having two or more search parameters; identifying data objects in the collection that match the search parameters; and providing results that include both an identification of matching data objects and an extent to which the objects match respective ones of the search parameters. The extent of match is shown by graphical bars having elongated segments of a unique color associated with each search parameter so that the user may visually appreciate the relevance of respective parameters in the compound query. A client device communicating with a server, receives an applet to effect the user interface. Each search parameter has an associated unique color and the user may specify a range of relevance desired in the results by altering the strength of any one of the search parameters. A computer-readable medium embodying program code and a corresponding apparatus are also disclosed.

14 Claims, 5 Drawing Sheets

U.S. PATENT DOCUMENTS

| | | | |
|---|---|---|---|
| 6,149,441 A * | 11/2000 | Pellegrino et al. ........... | 434/350 |
| 6,271,840 B1 * | 8/2001 | Finseth et al. ............... | 715/513 |
| 6,313,833 B1 * | 11/2001 | Knight ...................... | 705/36 R |
| 6,317,795 B1 * | 11/2001 | Malkin et al. ............... | 709/246 |
| 6,326,962 B1 | 12/2001 | Szabo | |
| 6,332,040 B1 * | 12/2001 | Jones ......................... | 382/197 |
| 6,366,296 B1 | 4/2002 | Boreczky et al. | |
| 6,567,822 B1 * | 5/2003 | Cudahy et al. .......... | 707/104.1 |
| 6,606,417 B1 * | 8/2003 | Brechner .................... | 382/240 |
| 6,636,853 B1 | 10/2003 | Stephens, Jr. | |
| 6,640,221 B1 * | 10/2003 | Levine et al. .................. | 707/3 |
| 6,691,138 B1 * | 2/2004 | Kirkpatrick et al. ........ | 707/204 |
| 6,701,311 B2 | 3/2004 | Biebesheimer et al. | |
| 6,772,139 B1 * | 8/2004 | Smith, III ...................... | 707/3 |
| 6,810,402 B2 * | 10/2004 | Bates et al. .............. | 707/104.1 |
| 6,938,207 B1 * | 8/2005 | Haynes ....................... | 715/711 |
| 6,990,238 B1 * | 1/2006 | Saffer et al. ................ | 382/224 |
| 7,043,094 B2 * | 5/2006 | Thomas et al. ............. | 382/305 |
| 2002/0054083 A1 | 5/2002 | Boreczky et al. | |
| 2002/0149614 A1 | 10/2002 | Biebesheimer et al. | |
| 2003/0023698 A1 * | 1/2003 | Dieberger et al. .......... | 709/207 |
| 2004/0088577 A1 * | 5/2004 | Render ...................... | 713/201 |
| 2004/0111467 A1 * | 6/2004 | Willis ........................ | 709/203 |

FOREIGN PATENT DOCUMENTS

| | | | | |
|---|---|---|---|---|
| EP | 1755056 | * | 2/2007 | ................... 17/30 |
| WO | WO 98/36343 | * | 8/1998 | |
| WO | WO 99/40510 | * | 8/1999 | ..................... 9/44 |
| WO | WO 2004/099916 | * | 11/2004 | |
| WO | WO 2005/001719 | * | 1/2005 | ................... 17/30 |
| WO | WO 2006/110684 | * | 10/2006 | |

OTHER PUBLICATIONS

Jonathan C Roberts et al. "visual Bracketing for web search result visualization", proceedings of the seventh internatinal conference on information visualization, 2003.*

Chahab Naster, "finding the right picture in the corbis collection", Apr. 7, 2003, 15 pages.*

Harald Reiterer et al. "visual information retrieval for the WWW", HCI international 2001, 9th international conference.*

Mao Lin Huang et al. "Graph visualization of web data with domain specific attributes",proceedings of the international parallel and distributed processing symposium, IEEE 2002, pp. 1-7.*

Kovalev, V et al. "color co-occurrence descriptors for querying-by-example", MMM'98 proceedings, multimedia modelling, 1998, pp. 32-38.*

Rohr,G "graphical user languages for querying information: where to lookfor criteria?", IEEE workshop on visual languages, 1988, pp. 21-28.*

Breiteneder,C et al. "automatic query generation for content-based image retrieval", IEEE international conference on multimedia and expo, 2000, vol. 2, pp. 705-708.*

Glass Engine (http://philipglass.com/glassengine#) 4 pp.

Grokker (search engine opening page) (http://www.grokker.com).

Query Previews in Networked Informaiton Systems Doan, et al., Dept. of Computer Science, U. of Maryland, 1996.

TitleBars: Visualization of Terms Distribution Information in Full Text Information Access, Hearst, Xerox Palo Alto Res. Center.

Studying Cooperation and Conflict between Authors with History Flow Visualizations, Viegas et al., vol. 6, No. 1, CHI Apr. 2004.

* cited by examiner

METHOD, SYSTEM, AND ARTICLE TO SPECIFY COMPOUND QUERY, DISPLAYING VISUAL INDICATION INCLUDES A SERIES OF GRAPHICAL BARS SPECIFY WEIGHT RELEVANCE, ORDERED SEGMENTS OF UNIQUE COLORS WHERE EACH SEGMENT LENGTH INDICATIVE OF THE EXTENT OF MATCH OF EACH OBJECT WITH ONE OF SEARCH PARAMETERS

BACKGROUND

This invention relates to data analysis, but more specifically to a method and system to search a database for relevant items of information, as well as an article of manufacture embodying computer program instructions enabling implementations of such a method and system.

As the quantity of data accessible via public and private networks increases, there becomes a greater need for efficient searching to identify and locate relevant items of information. Currently, most searching is performed using various forms of queries, content matching techniques, artificial intelligence, or other forms of data analysis to obtain targeted information sought by a user. Also, these systems enable a user to refine an initial query based on results fed back to the user.

Present-day query methods and systems, however, may not provide adequate feedback for compound queries, i.e., queries specifying two or more characteristics or search parameters (e.g., queries including Boolean combination of two or more keywords or phrases). Most present-day systems and method also lack overviews of results in a form that allows a user to identify and explore patterns that emerge during the search or analysis.

For a given compound query, a search engine such as Lycos online search tool returns a total number of matching data objects found and an ordered list of hyperlinks to matching data resources. The list typically starts with the closest matches followed by more distant matches. Each link is prefixed with an ordered sequence number. No indication, however, is provided as to the extent to which the identified link matches each of the terms in the compound query.

Similarly, given a multi-keyword query, another query engine provided by Delphion Research Intellectual Property Network Service returns a prioritized list of links to pieces of intellectual property (IP), where each link is followed by a percentage value indicating the closeness Delphion calculates the associated piece of IP (intellectual property) to be to a given set of keywords. Again, query engine does not provide the user with an indication of how close each item of IP is to each keyword in the compound query.

Google also returns an ordered list of links to matching data objects—ordered from the closest to the most distant, using its own metric for closeness. Google allows the user to have each link indicate which of the keywords occur its title. It does this by color-coding the query keywords, and then showing the color-coded keywords in the link titles. Thus, if the query were "(American apple pie)"—the query implicitly conjoins the keywords and Google highlights all instances of "American" with yellow, "apple" with blue, and "pie" with purple. This approach does not provide an accurate indication of the extent to which each link's data object matches the given query terms for at least two reasons. The first is that since "American" is longer than either "apple" or "pie," the color of the resulting page will be more yellow than either blue or purple. Thus, a given user obtains an incorrect indication that the matches very closely match "America."

Second, the words in a given link's title are not the only criteria to determine the link's position in the ordering (e.g., the data object's content is also used). For example, in the list of links returned by Google there is a link to an animation (www.markfiore.com/animation/looting.swf) concerning "American as apple pie" in which the link itself does not include any of the keywords. Here again, color-coding of the link title does not accurately reflect the extent to which the referenced data object matches the given query terms.

The Glass Engine (see http://www.philipglass.com/glassengine/# for details) provides an abstract graphical user interface (GUI) with which a user may explore musical works of composer Philip Glass. In addition to a detailed listing of the composer's works, the GUI provides an abstract graphical representation indicating the extent to which each work possesses one of five characteristics (specifically, joy, sorrow, intensity, density, and velocity). Upon selection of a particular musical work, the extent to which the selected work matches each of the five characteristics is shown abstractly and graphically using a bar-chart-like method. This provides an indication of how the selected work's extent of match compares with that of other works. The Glass Engine also allows users to specify match-extent ranges for each of the characteristics. So, for example, a user may specify a desire only to explore compositions whose intensity is in the low-to-high range and whose joy is in the medium (i.e., medium-to-medium) range.

Although the Glass Engine provides an indication of the extent to which data object (i.e., musical work by Philip Glass) match given characteristics: (1) a user cannot compare the matching level of two works side by side because the engine only displays the matching extent of a single work at a time; (2) the method does not provide an overview of the extent of match of multiple works at once, and (3) both the data objects and the characteristics are predefined, i.e., the user cannot add to either (e.g., no additional data objects, such as works by Bach; or characteristics, such as complexity).

Prior methods also exist that categorize the results of a given compound query and providing abstract graphic representations of results to end-users. After finding all data object matching a given compound query, Grokker (see www.grokker.com) automatically determines grouping of the objects into one or more categories. It then provides the user with an abstract graphical user interface through which the user may navigate these categories and their associated data objects. A system and method provided by U.S. patent application Publication US 2003/0225755 A1 is similar to Grokker, except that, rather than providing groupings of categorized data objects, it provides links to the data objects that indicate how closely each associated data object belongs to each of the automatically derived categories. In both cases, though, the user is not provided with any indication of how closely each discovered data object matches each of the compound query's search terms.

Query Previews (for details see Doan, K., Plaisant, C., and Shneiderman, B., "Query Previews in Networked Information Systems", *Proc. of the Third Forum on Research and Technology Advances in Digital Libraries, ADL '96*, Washington, D.C., May 13-15, 1996, IEEE CS Press, 120-129) provides a two-phase dynamic query method, designed to facilitate user's search while reducing the time spent awaiting data returns from the network. In a first phase—the Query Preview phase—users develop an initial query and obtain a graphic representation indicating the number of matching data objects without ever retrieving the full content of each of the objects. In this way, the user may adjust his or her query to avoid retrieving too many (e.g., thousands) or too few objects (e.g., zero). Once the user has developed a query with a reasonable number of matches, the user proceeds to a second phase, i.e., a Query Refinement phase, in which the user bases further query modifications on the content of the retrieved data objects. This method still does not provide any graphic representation indicating how each discovered data object matches each of the compound query's search terms.

History Flow (http://web.media.mit.edu/~fviegas/papers/history_flow.pdf) is a GUI that provides a representation of wiki versioning over time. It is a collaborative surveillance tool that helps wiki participants monitor content changes of a wiki. It offers a method for community analysis by showing patterns of site revisions through the wiki's history.

In contrast, an embodiment of the present invention provides a GUI that enables a user to make compound queries and displays a visualization of query results that shows the extent to which the parts of the queries match the overall compound query. In addition, such visualization exhibits query returns over any data set, whether the Internet, an intranet, wikis, blogs, or any other data source. Also, visualization displays results organized according to a relevance of match as opposed to History Flow's organization according to time. Advantageously, the present invention enables a complex query as opposed to community surveillance.

TileBars (for details, see Marti Hearst, TileBars: Visualization of Term Distribution Information in Full Text Information Access, Proceedings of the ACM SIGCHI Conference on Human Factors in Computing Systems (CHI), pp. 59-66, Denver, Colo., May 1995.) are similar in that they provide a visualization that helps users make judgments about the potential relevance of retrieved documents. TileBar querying allows multiple explicit search terms and visualizes them in such a way that shows what role the query terms played in the ranking retrieved documents. TileBars use text structure (document length, query term frequency and query term distribution) of the retrieved documents to build its visualization.

In view of the current state of the art, there remains a need for a system or method that takes a compound query, determines the matching data objects, and then provides not only access to the matching data objects, but also an indication of how closely each data object matches each of the compound query's search terms. There also remains a need for a system or method that provides an overview of all of the matching data objects, the overview providing indication of how closely each data object matches each of the compound query's search terms.

To address the needs of the art, one embodiment of the present invention provides an overview of the query results to indicate overall matches in a large data set. Such overview provides a visualization that orders results horizontally (rather than stacking them vertically) to provide a user with a more direct and swift visual comparison of the list of retrieved data objects. Further, visualization may also place retrieved data objects with similar matches next to each other to show overall patterns across the set of retrieved objects. Other embodiments of the invention allow iterative querying while in the midst of a query—easily signifying which terms are most important to a user by dragging a results indicator that corresponds with the term toward the middle thereby reordering the entire visualization according to shifting priorities.

SUMMARY OF THE INVENTION

A first aspect of the invention comprises a method of analyzing a collection of data that includes specifying a compound query having two or more search parameters; identifying data objects of the collection that match the search parameters; and providing a visual indication of results that include both an identification of matching data objects and an extent to which the objects match respective ones of the search parameters.

Another aspect of the invention comprises an article of manufacture in the form of a computer readable medium embodying programming code to effect an analysis of a collection of data in a computer by enabling a user to specify a compound query that includes two or more search parameters; to identify data objects of the collection that match the search parameters; and to provide results that include both an identification of matching data objects and an extent to which the objects match respective ones of the search parameters.

A further aspect of the invention comprises an apparatus to search a collection of data, which includes a user interface handler to enable a user to specify a compound query that includes two or more search parameters; a search engine to identify data objects of the collection that match the search parameters; and a display handler to provide results to a user that include both an identification of matching data objects and an extent to which the objects match respective ones of the search parameters.

Other aspects and features of the invention will become apparent upon review of the following description taken in connection with the accompanying drawings. The invention, though, is pointed out with particularity by the appended claims.

DESCRIPTION OF ILLUSTRATIVE EMBODIMENTS

Figure 1:
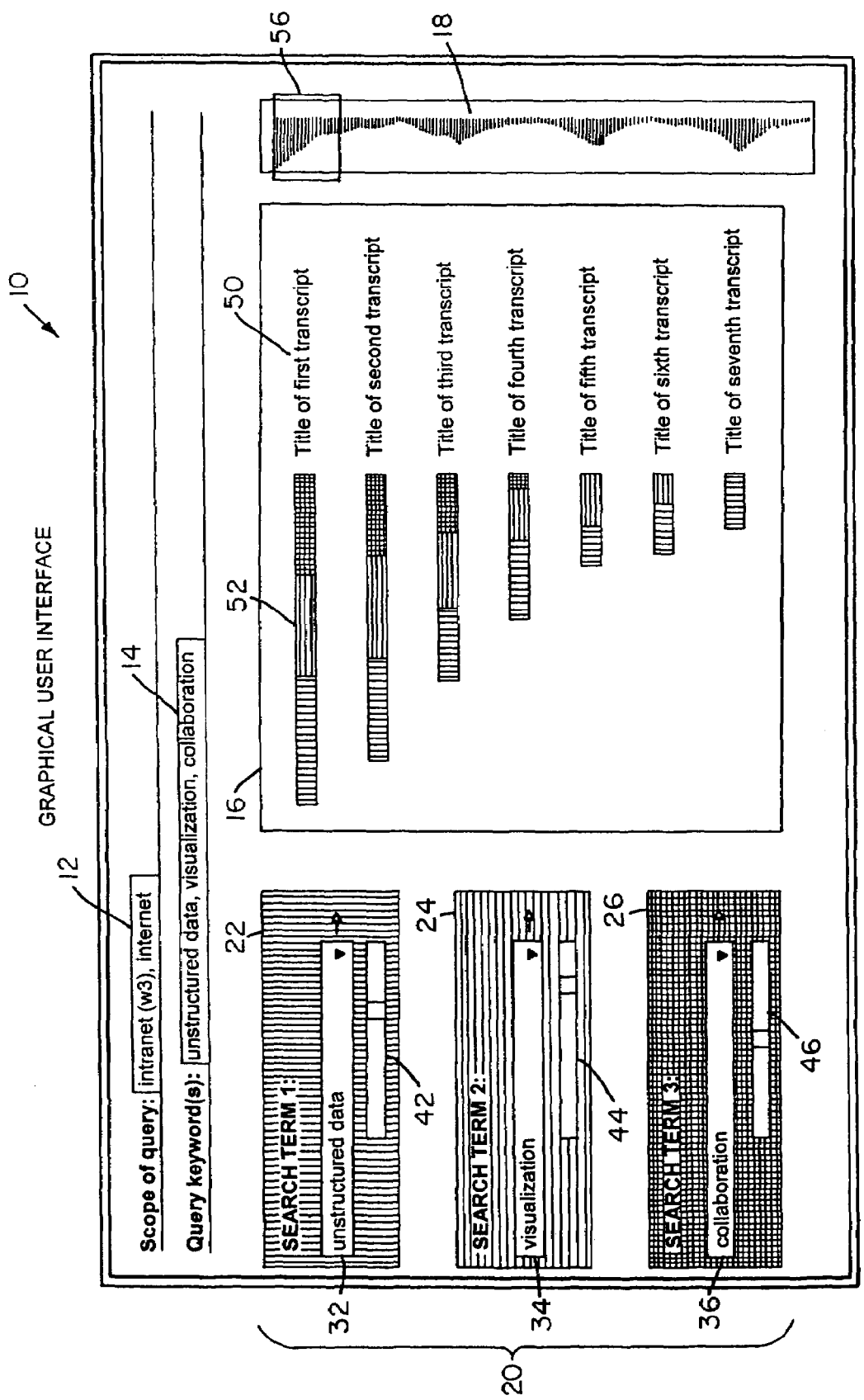
FIG. 1 shows a graphical user interface that may be used in accordance with one aspect of the present invention.

According to the illustrated embodiment, a user may explore a collection of data objects using the graphical user interface of FIG. 1, which provides comparative results of queries in visual form. Retrieval and inspection may be accomplished by a user working from a web browser that communicates with a web server via a network. The server supplies the user's web browser with a fully functioning application (e.g., an applet) to handle interactions between the user and the application where the application may be downloaded via a web request (e.g., an HTTP GET command) from the server.

The GUI or user interface 10 of FIG. 1 includes four main components: a scope field 12 to define the body of data to be queried, a search term field 14 to specify keywords or compound search terms, a results field or pane 16 to list the retrieved data objects that match the query, and an overview field 18 to present an overview of the retrieved results.

The scope of the query in field 12 allows various data stores to be targeted or searched whether they include the Internet, an intranet, a web store, a company database, etc. Those skilled in the art may appreciate various ways to allow a user to select the data store or combination of data stores to be queried.

Keyword definition area 20 includes separate subfields 22, 24, and 26 within which there are respective text fields 32, 34, and 36 to enter parts of a compound query, and slider bars 42, 44, and 46 with which to adjust the strength of respective search terms of the compound query. Users may type a combination of terms in one of the text fields 32, 34, or 36 or separate the terms for placement in multiple text fields 32, 34, or 36. Combinations of words may also be supplied in any one or all of the text fields.

When a term is supplied in the first text field 32, a list of relevant matches is displayed on the pane 16 in descending order of relevancy. Each returned match has a title 50 and is accompanied by a color-segmented bar 52 that illustrates the extent to which that particular keyword is relevant in the retrieved data object or document. Terms that are related to the initial search term may be presented to the user in the next text field 34 as a pull down menu. The user may select from the suggested terms or type new terms.

As terms are added to the query, documents are retrieved and listed in pane 16 alongside the color-segmented bar 52 (respective colors corresponding with the color of subfields 32, 34, and 36) whose length indicates the strength of the term in that document (i.e., extent of relevancy). Wherever multiple terms appear in a retrieved document, multiple segments of bar 52 appear alongside the title 50. FIG. 1 shows an example where the first item on the list includes all three of the search terms with relatively high relevancy (all three colored segments are shown in bar 52 next to the title 50 and they are all or relatively long length, indicating high possible relevancy. The remaining matches in pane 16 are ordered in such a way that produces an overall pattern (a+b+c, a+b, b+c, c+a), which puts like documents next to each other and builds the overall visualization 18.

An overview visualization pane 18 aids the user in analyzing the kinds of information that has been returned over the entire data set. Pane 18 enables the user to visualize 'and/or' combinations present in the returned matches, to see the subsets of documents that fit the query in specialized combinations, and to see how the search terms are represented across the data set being queried (e.g., how pervasive or strong the terms are in relation to the whole). A square 56 near the top of the visualization pane 18 indicates what portion of the list is being viewed in central pane 16. In other words, square 56 indicates the view field shown within pane 16 being viewed by the user.

Once a list of documents is returned, refinements can be made without starting over the search in entirely. This may be accomplished by adjusting the sliders 42, 44, and/or 46 associated with each of the search terms in the compound query. For example, slider 42 associated with the first term 'unstructured data' can be pulled to the right to only include the documents that have a very high relevancy, or pulled to the left to include even documents having a lower relevancy, whereupon the list in pane 16 will be edited down. One skilled in the arts will appreciate that a range of relevancy may be specified, e.g., "show me all documents that match the middle range of relevancy, but not the low or high relevance documents."

Another way to refine the search is to manipulate the bars in the center pane 16. For example, a user may drag the yellow segment of bar 52 of the first item on the list to the first, second or third position (which it currently occupies). If the yellow segment was dragged to the first position, the new order would be yellow, red, blue and the overall pattern would be shifted to pull more of the documents associated with the 'yellow' term ('collaboration') closer to the top. It should be noted that delineation between search terms may be indicated by other colors or by other types of visual indications without departing from the invention.

Figure 2:
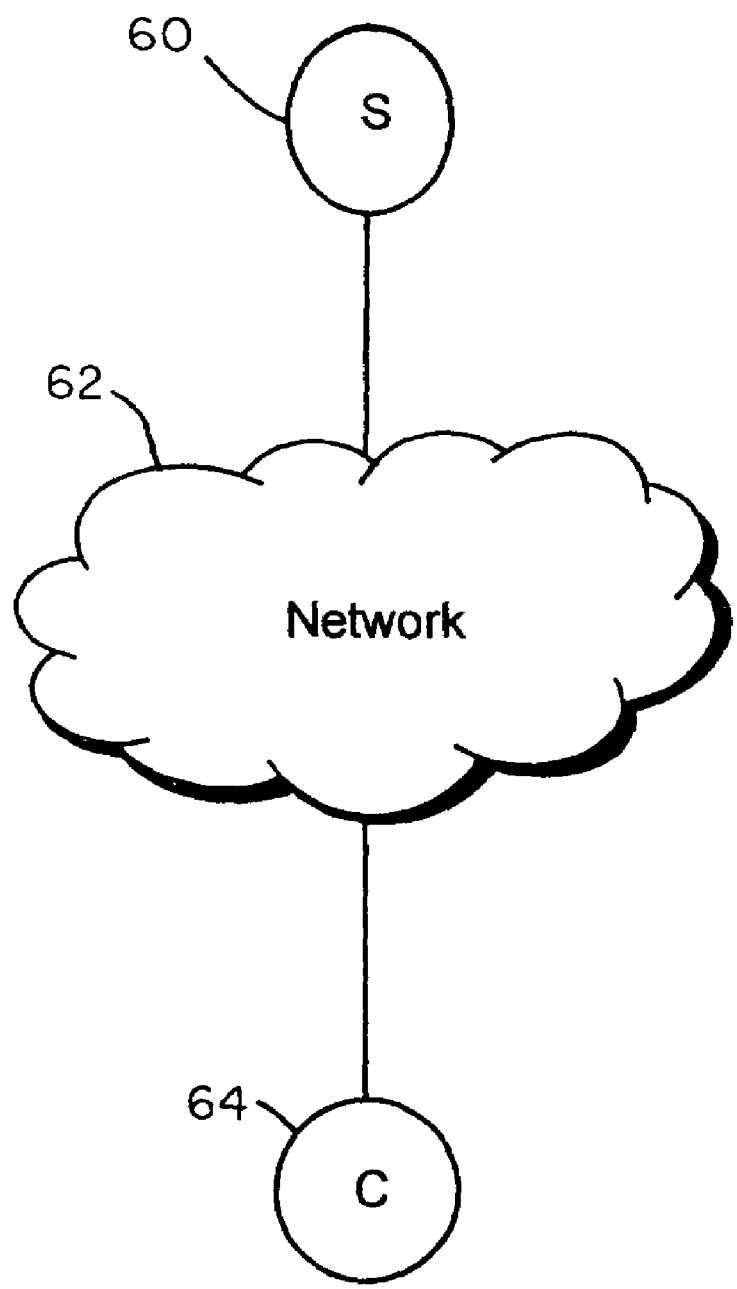
FIG. 2 shows a network topology including a server, a client, and a network according to an embodiment of the present invention.

FIG. 2 depicts a network topology in which the illustrated embodiment may be deployed. As shown, server 60 (described in greater detail with reference to FIGS. 3 and 4) communicates with client 64 via network 62. The network 62 includes, but is not limited to, the Internet, an internal intranet, stored database, internal corporate network or the like whether a wireless on wired telecommunication network. Although only one client node 64 is shown, multiple clients may be accommodated. Also, although the illustrated embodiment involves a Web-based (i.e., HTTP) network, other forms of network communication may utilize the invention, such as a raw sockets-based client/server architecture Examples of platforms that support client 64 include any device that acts as web client (i.e., runs a web browser application and communicates with a server 60 via a network 62). By way of example, such device includes an IBM ThinkPad running Windows 95 and a web browser such as Microsoft's Internet Explorer. A client or client device may also include network-connectable mobile (i.e., portable) devices such as that sold under the trademark WorkPad by IBM, as well as smart cellular telephones (i.e., devices that act as a cellular telephone as well as run network applications, like web browsers), such as those sold under the trademark Nokia 90008 by Nokia.

Figure 3:
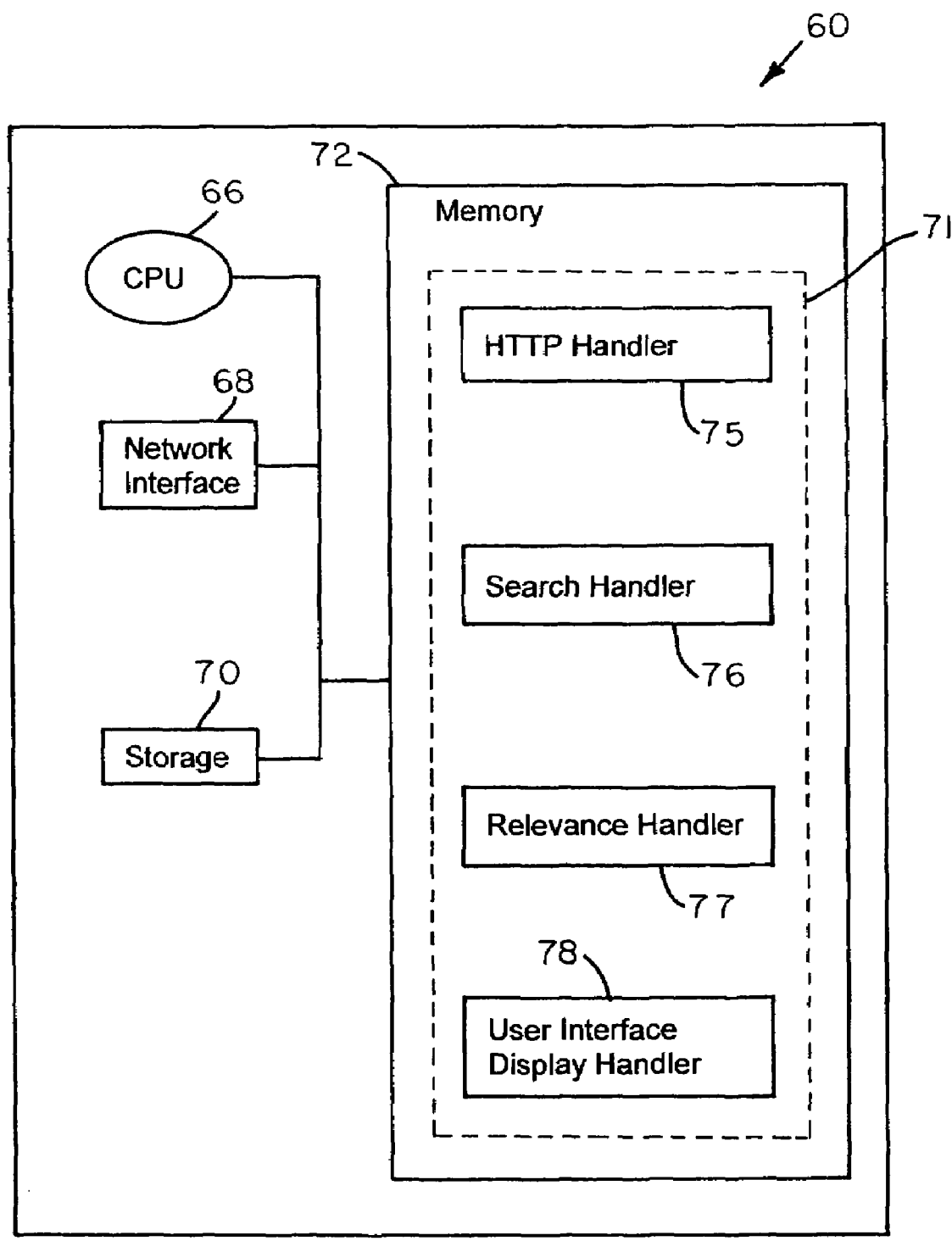
FIG. 3 illustrates modules of the server of FIG. 2 according an illustrated embodiment of the present invention.

FIG. 3 depicts a diagram of software modules of the server 60 shown in FIG. 2, which provides the search interface and functionality described relative to FIG. 1. Server 60 may comprise any computing node able of acting as an HTTP server, including, but not limited to, products sold by IBM under the trademarks ThinkPad or PowerPC, running the operating system and server application suite sold by Microsoft under the trademark Windows NT, or Linux. In practice, computer programming code implements the modules of server 60 but in certain situations, it may be more practicable to implement some or all modules in hardware or firmware.

Server 60 preferably includes a CPU 66, a network interface 68, a storage device 70 such as a disk or DASD, and memory 72, such as a RAM. In the illustrated embodiment, the server logic or program instructions of memory 72 (which is further discussed relative to FIG. 4) is implemented as executable computer code loaded from a remote source (e.g., over the network 62 (FIG. 2) via the network interface 68), or loaded from a local permanent optical (CD-ROM), a magnetic storage device (such as disk), or DASD provide by storage 70.

An executable program module 71 of memory 72 includes an HTTP Handler 75, a Search Handler 76, a Relevance Handler 77, and a User Interface Display Handler 78. These are discussed in detail with reference to FIG. 4. The HTTP Handler 75 responds to web-based HTTP communications, including, but not limited to the product sold by WebSphere.

Figure 4:
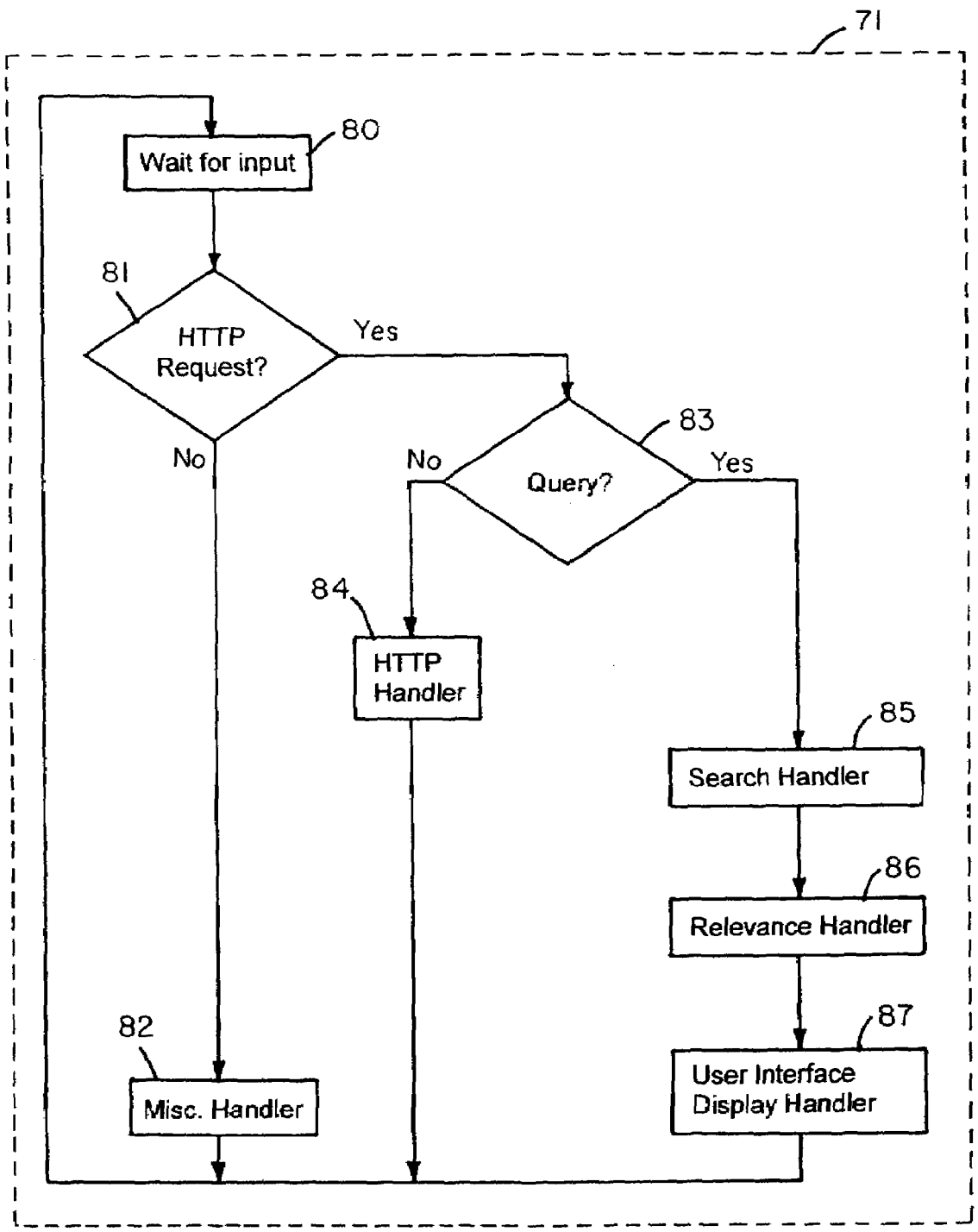
FIG. 4 illustrates logic operations of the server shown in FIG. 3 according an embodiment of the present invention.

FIG. 4 is a logic flow diagram implemented by server logic 71 (FIG. 3), i.e., the control flow of server 60. As shown, server 60 awaits an input at step 80, and then checks whether the input is an HTTP request at step 81. If the input is not an HTTP request, then a miscellaneous handler 82 is invoked and thereafter returns to the initial input step 80. If the input at step 81 is identified as an HTTP request, the input is checked in step 83 to determine if it is a query. If not, the HTTP Handler 84 is called, which handles the specified HTTP request, following which control continues at step 80. If at step 83 the input is determined to be a query, then Search Handler 85 is called to retrieve data objects matching the specified query. Following this, Relevance Handler 86 is invoked to determine how closely each of the retrieved data objects matches each of terms in the specified compound query. Thereafter, the User Interface Display Handler 87 is invoked to calculate and return the results display user interface (previously described with reference to FIG. 1) to provide an abstract graphic representation of the data and its relevance to the query. After step 87, control continues at step 80.

Figure 5:
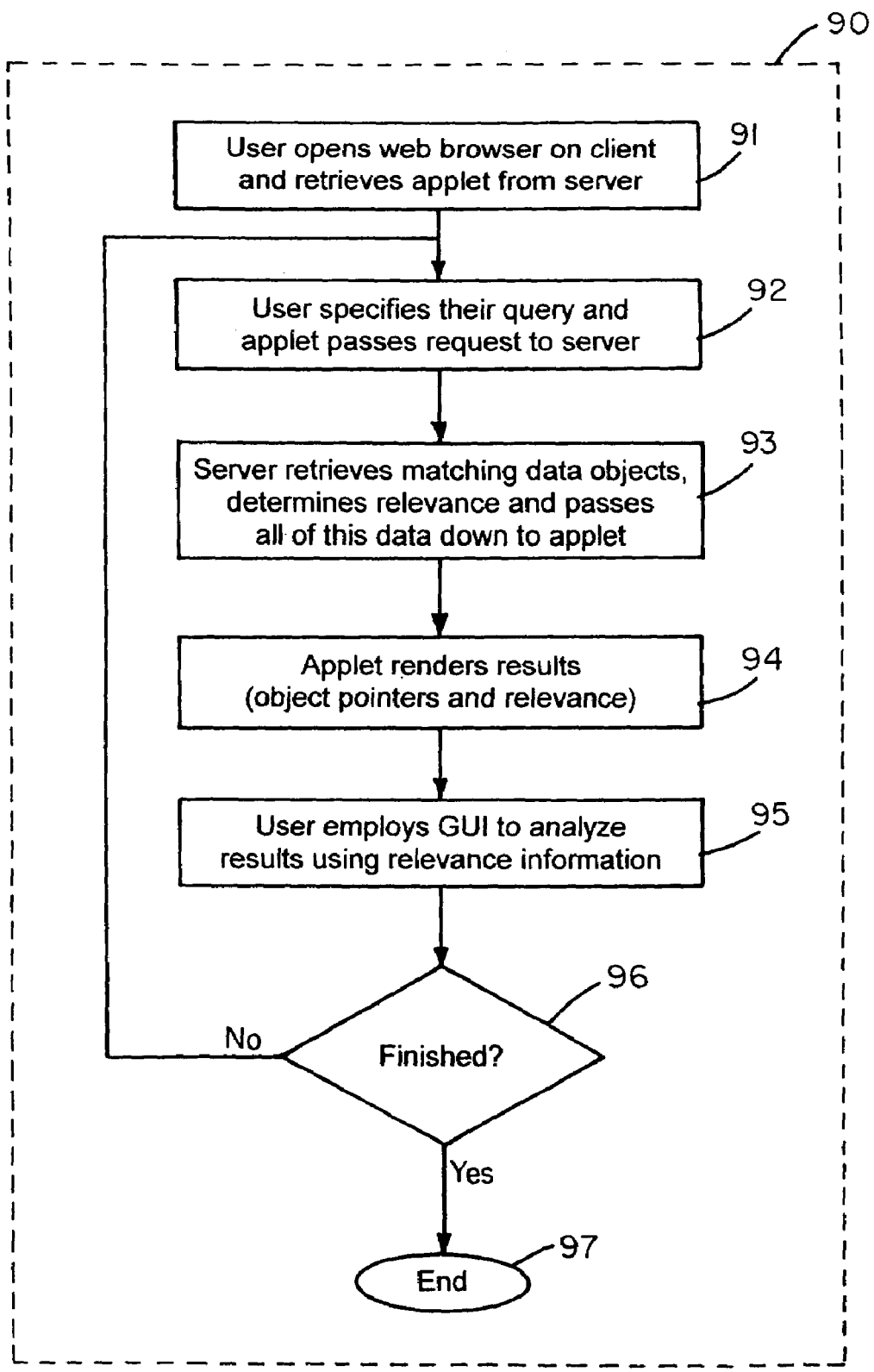
FIG. 5 shows an example of a method according an embodiment of the present invention.

FIG. 5 depicts an overview of a method 90 according to an embodiment of the present invention. The illustrated method may be implemented in a computer using a computer-readable medium, i.e., an article of manufacture, that embodies programming code to effect the steps specified in the illustrated method. As shown, in step 91, a user first open a web browser application on a client device and then retrieves the user interface applet from the server 60 (FIG. 2). In step 92, the user specifies a query and then the applet passes the request to the server 60. In step 93, the server processes the query (which processing was set forth in the description relative to FIGS. 3 and 4) thereby returning the matching data object(s), relevance data, and a visual presentation to the client applet when done. Next, in step 94, the applet effects a display or rendering in the client device of the data received from the server 60, as set forth in the description relative to FIG. 1. The user then employs the graphical user interface to further analyze or search the collection of data for relevant data objects. Following this, in step 96, the method determines whether the user is finished, ending the method in step 97 if finished or, if not, continuing control at step 92 where the user may specify a new or modified query.

The illustrated embodiment shows three subfields for entry of query terms but is not limited to that number. As indicated by the teachings herein, two or more subfields may be used and each subfield may support one or more search terms. An indicator other than color, e.g., text size, different or unique cross-hatching, different monotone shades, etc. may also be used to delineate between or among search term(s) in the query results. The layout of visual elements of the graphical user interface may also be varied. Slider bars or numerical weights may interchangeably indicate a desired search term strength for control purposes. Horizontal as well as vertical multi-segmented bars may be used. A central viewing pane may be vertically elongated to show the entire search results whereupon the view field indicator becomes unnecessary. Accordingly, the invention is not limited to the illustrated embodiments but embraces such variations within the teachings herein as may come to those skilled in the art.

The invention claimed is:

1. A computer-implemented method of enabling a user to access a memory via an input device in order to search and analyze a database that includes a collection of data and to obtain an indication of search results via a graphical user interface, said method comprising:

a. enabling said user to specify a compound query via said input device by entering two or more search parameters according to at least one of a given order and a desired weight of relevance wherein each of said search parameters has a unique color associated therewith;
   b. providing on said user interface an identification of data objects in said database that match said search parameters;
   c. providing on said user interface a visual indication of overall results that includes both an identification of matching data objects and an extent to which the data objects match respective ones of the search parameters and, for each of said data objects identified in the overall results, said visual indication includes a series of graphical bars each having ordered segments of said unique colors where each segment has a length indicative of the extent of match of each data object with one of said search parameters, said user interface further including a controllable view field window to enable said user to select an expanded area of view on said user interface of at least a portion of said overall results of matching data objects for presentation to said user; and
   d. further providing the user with an option to reorder or again specify a desired weight of relevance of said search parameters in order to output further search results.

2. The method of claim 1, wherein said user interface includes a text subfield associated with each search parameter within which said user enters a search parameter, and each text subfield is associated with one of said unique colors.

3. The method of claim 2, wherein said user interface includes a slider bar associated with each of said text subfields that is operable by a user to vary said weight of desired relevance.

4. The method of claim 1, wherein said providing step includes providing said results to a client via a server communicating with said client over a network.

5. The method of claim 4, wherein said server conveys to said client an applet to enable display of said results on a display device of said client.

6. The method of claim 5, wherein said applet provides a list of data object ordered according to ordering of appearance of colors in said graphical bar and respective lengths of segments in said graphical bar.

7. The method of claim 6, wherein said apple enables a user to reorder the appearance of colors in said graphical bar to effect reordering the list of data objects according to a reordered appearance of said colors.

8. The method of claim 7, wherein said applet enables reordering by dragging and dropping said segments of said graphical bar.

9. The method of claim 8, wherein said user interface provides a subfield having an associated unique color for each search parameter.

10. An article of manufacture comprising a computer readable medium embodying programming code executable by a processor of a computer system to enable a user to search and analyze a collection of data in a computer database residing in a memory of said computer system, said programming code being operative a) to enable a user to specify via an input device a compound query according to at least one of a given order and a desired weight of relevance wherein the compound query includes two or more search parameters; b) to provide on a user interface an identification of data objects of the collection that match said search parameters; c) to provide on said user interface an indication of unique colors associated with respective ones of said search parameters; d) to provide overall results on said user interface that include both an identification of matching data objects and an extent to which the data objects match respective ones of the search parameters wherein said results includes, for each matching data object, a graphical bar having ordered segments of unique colors where each segment has a length indicative of an extent of match of said data objects with respective ones of the search parameters; e) to provide a controllable view field window on said user interface to enable said user to select an expanded area of view of at least a portion of the overall results of matching data objects; and (d) to further provide the user with an option to reorder or again specify a desired weight of relevance of said search parameters in order to output further search results.

11. The article of claim 10, wherein said programming code provides on said user interface a text subfield associated with each search parameter where each subfield is associated with one of said unique colors.

12. A database search and analysis system including a processor, a memory, a user input device, and a graphical user interface to enable a user to search and analyze a collection of data stored in a database memory, said system comprising:
   a user interface handler executed by said processor to enable said user to specify via said input device a compound query according to at least one of a given order and a desired weight of relevance wherein the compound query includes two or more search parameters and in response to said query to associate unique colors with respective ones of said search parameters;
   a search engine executed by said processor to identify data objects of the collection that match said search parameters; and
   a display handler executed by said processor to provide overall results on said user interface that include, for each matching data object, a segmented color bar where each segment indicates through color matching an identification of matching data objects wherein the length of each segment indicates an extent to which the data objects match respective ones of the search parameters, and wherein said display handler further provides a controllable view field window to enable said user to select an expanded area of view of at least a portion of said overall results of matching data objects;
   said user interface handler further providing the user with an option to reorder or again specify a desired weight of relevance of said search parameters in order to obtain further search results.

13. The search and analysis system of claim 12, wherein said user interface handler includes a text subfield associated with each search parameter, and each subfield is associated with one of said unique colors.

14. The search and analysis system of claim 12, wherein a client device provides a user interface for said user interface handler and a server provides said search engine, and said client device and said server communicate over a network.

* * * * *